United States Patent [19]

Depas, Sr.

[11] 4,166,656
[45] Sep. 4, 1979

[54] FLUID OPERATED MODULATING VALVE

[75] Inventor: Laddie A. Depas, Sr., Louisville, Ky.

[73] Assignees: Maurice L. Miller; Harold W. Thomas, ; part interest to each

[21] Appl. No.: 804,614

[22] Filed: Jun. 8, 1977

[51] Int. Cl.² ............... B60T 15/02; F16K 15/14
[52] U.S. Cl. ........................ 303/115; 137/512.15
[58] Field of Search ............ 303/115; 137/512.15; 188/181 C

[56] References Cited

U.S. PATENT DOCUMENTS

3,463,189  8/1969  Fitzpatrick ............... 137/512.15

Primary Examiner—Trygve M. Blix
Assistant Examiner—Reinhard J. Eisenzopf
Attorney, Agent, or Firm—Maurice L. Miller, Jr.

[57] ABSTRACT

A device for monitoring a difference between the speeds of rotation of two rotating members featuring a differential gear assembly having two driven gears and at least one follower gear intermeshed and disposed within a rotatable housing is disclosed. The follower gear is rotatably connected to the housing to permit the housing to rotate at a speed proportional to a difference in speed between the two driven gears, the driven gears being connectable, respectively, to two different rotating members whose speeds are to be compared. A rotary fluid valve is disclosed which responds to the rotation of the rotatable housing to generate fluid output signals indicative of a difference in speed between the two rotating members. A system for automatically controlling the application of brakes to a wheeled vehicle traveling in either a forward or reverse direction which employs the monitoring device and the fluid valve to generate a fluid signal to correct a wheel skid or spin condition is also disclosed.

4 Claims, 18 Drawing Figures

FLUID OPERATED MODULATING VALVE

BACKGROUND OF THE INVENTION

This invention relates generally to devices for monitoring a difference between the speeds of two rotating members and more specifically to a system employing a gear differential disposed in a rotatable housing and connected between a vehicle wheel and an inertial vehicle speed reference, such as a flywheel, to monitor the occurence of a wheel skid or spin condition. The device also generates a fluid or other signal suitable for maintaining two rotating members at the same speed or for controlling a vehicle brake applicable to each wheel to control such skid or spin conditions.

Previously, I have disclosed a system for automatically controlling the brakes applicable to a vehicle wheel to control skidding or spinning thereof which provides a continual demand for fluid from a vehicle fluid supply source. See my previously filed U.S. Patent application, Ser. No. 640,865, filed Dec. 15, 1975, now U.S. Pat. No. 4,088,375 entitled, Automatic Skid and Spin Control System for Vehicle Brakes and Method. Also in order to maintain a constant low pressure supply of air or vacuum to that system, even when the vehicle brakes are not in use, additional valves are required. Further, in order to insure rapid response to a wheel spin condition, a by-pass valve must be employed to direct high pressure air directly from the fluid source to the fluid valve wheel and vehicle speed sensors and thereby by-pass certain valves operated by the brake pedal and responsive thereto. Also, a loss of fluid to a certain portion of that system through mechanical failure or rupture of a line could prevent manual brake application to the vehicle wheels.

The device of my invention, particularly when employed in a vehicle brake control system substantially overcomes these and other difficulties encountered in the prior art.

SUMMARY OF THE INVENTION

It is an object of my invention to provide a device for monitoring a difference between the speeds of two rotating members whose speeds are to be compared.

It is a further object of my invention to provide said monitoring device with a differential gear assembly housed within and operatively connected to a rotatable housing whose rotations are indicative of a difference between the speeds of the two rotating members, the direction of rotation of such housing being indicative of which of the two members is rotating the fastest and which is rotating the slowest.

It is yet another object of my invention to provide a rotary fluid valve which, among other applications, can be employed in my monitoring device to sense the speed of rotation of the rotatable housing and generate a fluid output signal whose pressure, within a selected range, is proportional to a difference between the speeds of two rotating members.

It is also an object of my invention to provide an improved system for automatically controlling a brake applicable to a wheel of a vehicle employing the monitoring device of my invention therein to control vehicle wheel spin and skid conditions.

It is further an object of my invention to provide an improved and simplified system for automatically controlling a brake applicable to a wheel of a vehicle using the monitoring device of my invention to control vehicle wheel skid conditions.

It is moreover an object of my invention to provide an improved fluid operated rotary valve.

It is also an object of my invention to provide a vehicle anti-skid and anti-spin control system which only utilizes fluid from a fluid source when a wheel skid or spin condition occurs such that the vehicle fluid driving source may be shared between the system of my invention and other fluid operated systems of the vehicle.

These and other objects of my invention will become apparent to those skilled in the art from the following detailed description and attached drawings upon which, by way of example, only the preferred embodiments of my invention are illustrated.

DESCRIPTION OF THE PREFERRED EMBODIMENTS

Figures 1, 2, 3, 4:
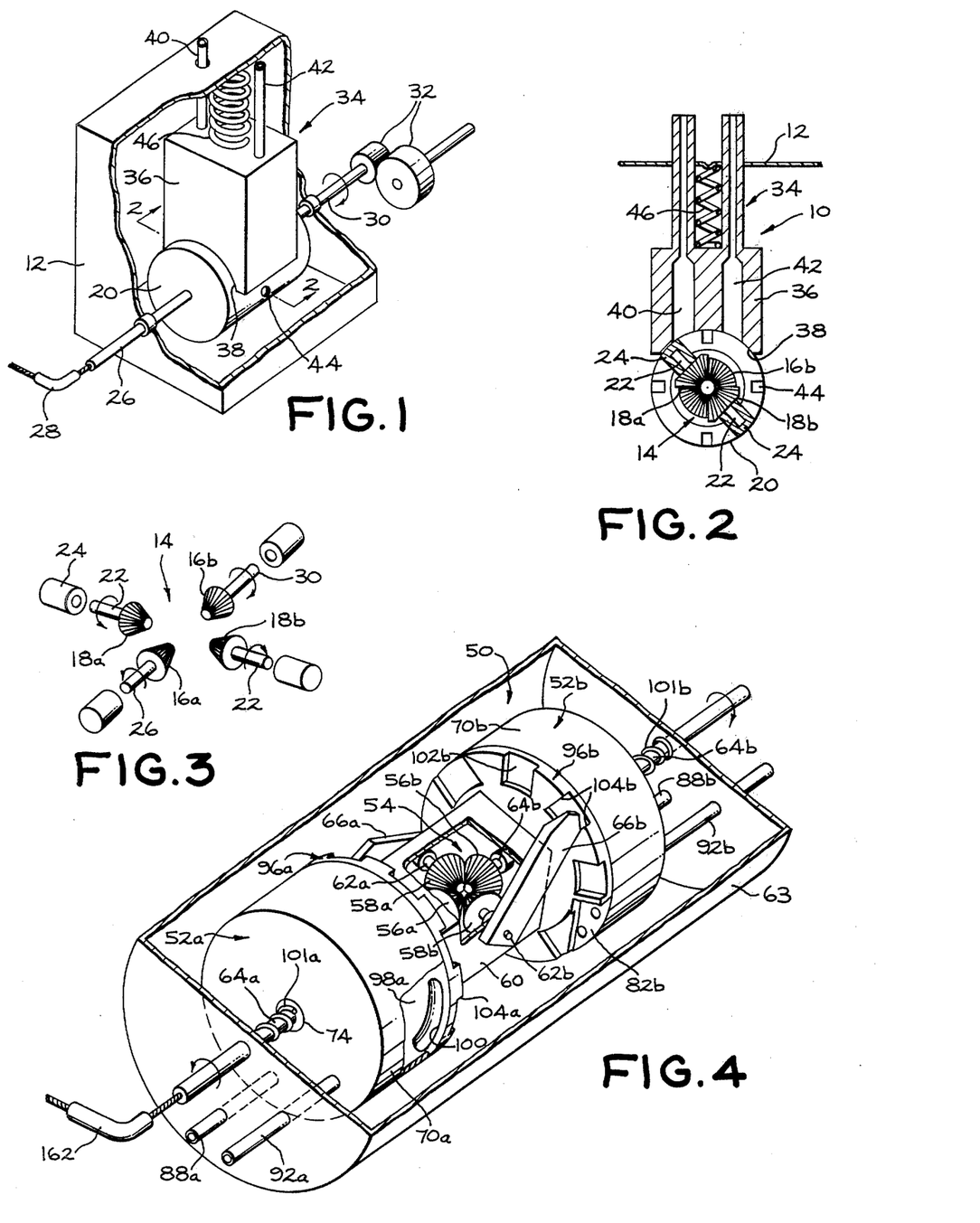
FIG. 1 shows an oblique projection of a device for monitoring a difference between the speeds of two rotating members illustrating one preferred embodiment of my invention.
FIG. 2 shows a cross-sectional view of the device of FIG. 1 as viewed along lines 2—2 thereof.
FIG. 3 is an exploded oblique projection of a differential gear assembly employed in the device of FIGS. 1-2.
FIG. 4 shows an oblique projection of a device for monitoring a difference between the speeds of two rotating members illustrating another preferred embodiment of my invention.

Referring now to FIGS. 1–3 there is shown a device 10 for monitoring a difference between the speeds of rotation of two rotating members disposed within a suitable container 12 and including a differential gear assembly 14 having four intermeshed gears, two of which are opposing driven gears 16a and 16b, and two of which are opposing follower gears 18a and 18b. The assembly 14 is disposed within a rotatable housing 20 to which the follower gears 18a, 18b are rotatably connected by means of gear shafts 22 rotatably inserted within a pair of bushings 24 attached to the interior wall of the housing 20.

One of the driven gears 16a is connected by means of a drive shaft 26 through one end of the housing 20 to a flexible drive cable 28 exterior to the housing 20 and container 12. The cable 28 may, in turn, be connected to a rotatable member not shown, in any usual and well known manner. The other driven gear 16b is connected by means of a drive shaft 30 through the other end of the housing 20 to a gear train 32 exterior to the housing 20 and container 12. The gear train 32 may, in turn, be connected to a second rotatable member, not shown, whose speed of rotation is to be compared with that of the first rotating member connected to the cable 28. The rotating members need not be shown since they may be of any desired type such as engine crankshafts, motor or generator rotor shafts, flywheels, automobile wheels, mechanically driven gear assemblies and so on. Such rotating members need only be capable to rotatably driving the shafts 16a and 16b of the assembly 14 either directly or through any suitable mechanical linkages such as the gear train 32. In the present example, the use of the flexible cable 28 and the gear train 32 to drive the shafts 26 and 30, respectively, are merely illustrative of two different means of linking the rotating members to the driven gears 16a and 16b.

Now when the shafts 26 and 30 are rotated at different speeds, the assembly 14 becomes unbalanced due to the response of its four intermeshed gears such that the housing 20 will rotate about the axis of rotation of the driven gears 16a, 16b. Moreover, the speed of rotation of the housing 20 will be proportional to the difference between the speeds of rotation of the drive shafts 26 and 30, while the direction of rotation of the housing 20 will be indicative of which of the shafts 26 and 30 is rotating at the slower or faster speed. If desired, the drive train 32 can be used to provide a step-up or step-down in speed between the shaft 30 and the rotating member connected to the drive train 32 in which event, the speed of rotation of the housing 20 can be made proportional to the difference in the speeds of rotation of the rotating members.

A principal advantage of the device 10 is the fact that the housing 20 only rotates when there is a difference between the speeds of the driven gears 16a and 16b. Thus, assuming that the gears 16a and 16b are identical, there will only be a rotation of the housing 20 when there is a difference between the speeds of the rotating members. Furthermore, the speed of rotation of the housing 20 will be proportional to that difference regardless of the speeds at which the rotating members are running. On the other hand, when there is no difference between the speeds of rotation of the gears 16a and 16b, then the assembly 14 is balanced, and the housing 20 remains at rest, regardless of the speed at which the shafts 26 and 30 rotate.

By utilizing this physical feature of the differential gear assembly 14 and rotatable housing 20, it then becomes a matter of providing a convenient means for sensing the rotation of the housing 20 in order to monitor a difference between the speeds of the two rotating members. In the present example, I provide a fluid operated valve 34 for this purpose having a housing 36 which defines a concave base 38 adapted to slidably engage the periphery of the housing 20 in close conforming relation. The housing 20 further defines a fluid inlet chamber 40 for introducing a high pressure fluid, such as air, to the valve 34 from an external source, and a fluid outlet chamber 42 for discharging a quantity of fluid from the valve 34, each of which chambers open onto the concave base 38.

The housing 20 contains four hollow storage chambers 44 which open onto the periphery thereof and are aligned so as to pass in sequence through registry with the openings of the inlet and outlet chambers 40 and 42 as the housing 20 rotates. As each chamber 44 rotates in a clockwise direction as viewed in FIG. 1, it will pass under the opening to the inlet chamber 40 and receive a quantity of fluid therefrom. After passing beyond the opening of the inlet chamber 40, each storage chamber 44 temporarily stores the quantity of fluid received therein until the opening of the chamber 44 rotates into registry with the opening of the outlet chamber 42, at which point the fluid in the chamber 44 is discharged into the outlet chamber 42. Accordingly, the faster the housing 20 and chambers 44 rotate, the more fluid that will be transferred from the inlet chamber 40 to the outlet chamber 42 in a given amount of time, and the higher will be the average pressure in the outlet chamber 42, up to the point of saturation of the valve 34 wherein the pressure of fluid in the inlet chamber 40 begins to drop. Where it can be anticipated that the housing 20 will rotate so rapidly that saturation of the valve 34 may occur, the gear train 32 may be adapted to step down the speed of the shaft 30 so that the housing 20 will always rotate within a region of speed for which operation of the valve 34 remains linear.

In order to insure a fluid tight fit between the housing 20 and 36, a spring 46 is confined between the container 12 and the housing 36 and maintained at a suitable degree of compression. While it may be preferrable to provide the housing 20 with a plurality of separate storage chambers 44 spaced around the periphery thereof, the valve 34 can be operated with only a single one of such chambers. It should also be mentioned here that the openings of the chambers 40 and 42 on the concave base 38 should be selectively aligned and spaced sufficiently far apart so that the chambers 44 will not interconnect the inlet chamber 40 directly to the outlet chamber 42 at any time during the rotation of the housing 20. It will also be apparent that the valve 34 can be operated by rotating the housing 36 about the housing 20 or by rotating both such housings relative to one another.

As mentioned earlier, any other suitable means for sensing the rotation of the housing 20 such as vacuum devices, electrical, electronic and photoelectric means may be employed in place of the fluid sensor of the present example. In addition, another suitable fluid operated valve for use in place of the valve 34 of the present example is disclosed in my U.S. Patent application, Ser. No. 640,865, filed Dec. 15, 1975 and entitled Automatic Skid and Spin Control System For Vehicle Brakes and Method.

It will also be apparent to those skilled in the art that, while the use of four intermeshed gears 16a-b and 18a-b in the differential gear assembly 14 is preferrable, the assembly 14 need only include three intermeshed gears, two being the opposing driven gears 16a, 16b, and the third being a single one of the follower gears 18a or 18b rotatably connected to the housing 20. Moreover, the driven gears 16a, 16b may be of different sizes, in which event rotation of the housing 20 will be proportional to a difference in speed between the rotatable shafts 26 and 30.

Referring now to FIGS. 4-11 there will be seen, in another preferred embodiment of my invention, a device 50 (FIG. 4 only) for monitoring a difference between the speeds of rotation of two rotating members. A pair of fluid operated sensing valves 52a and 52b is included therein. Also shown is a differential gear assembly means 54 consisting of two driven gears 56a, 56b and two follower gears 58a, 58b. The assembly means 54 is disposed within a rotatable housing 60 and the follower gears 58a, 58b are rotatably connected to and through the housing 60 by means of shafts 62a, 62b, respectively. A suitable container 63 is provided to house the entire mechanism.

The driven gears 56a, 56b are connected by means of driven shafts 64a, 64b through the housing 60 and the centers of the valves 52a, 52b to points exterior to the container 63 for connection in any suitable manner to two different rotating members as explained in the previous example. A pair of ratchet arms 66a, 66b are connected to the rotatable follower gear shafts 62a, 62b, respectively, on the exterior of the rotatable housing 60.

Figure 6:
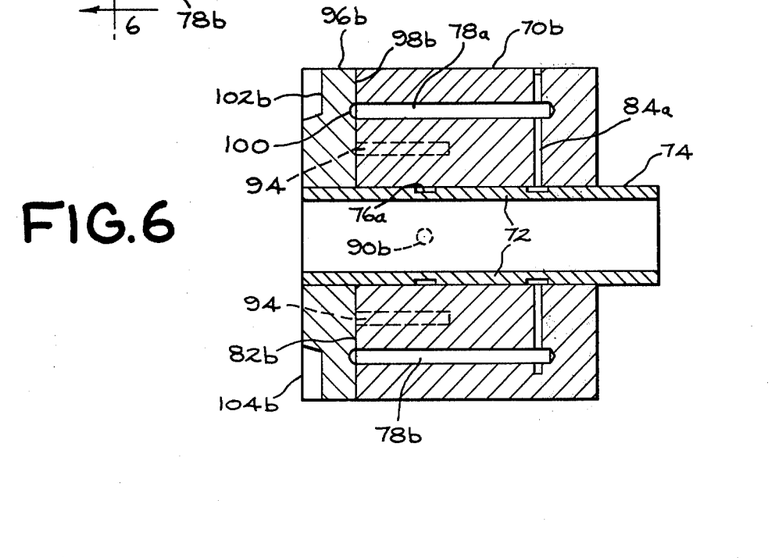
FIG. 6 shows a cross-sectional side elevation view of the valve housing of FIG. 5 and the rotatable plate of FIG. 8 as viewed along lines 6—6 thereof.
Figure 7:
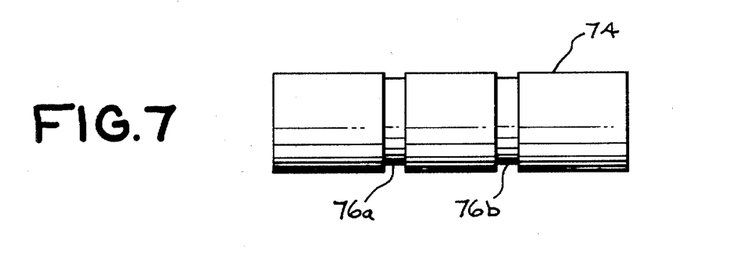
FIG. 7 shows a side elevation view of a grooved bushing employed in the valve housing of FIGS. 4-6.
Figure 8:
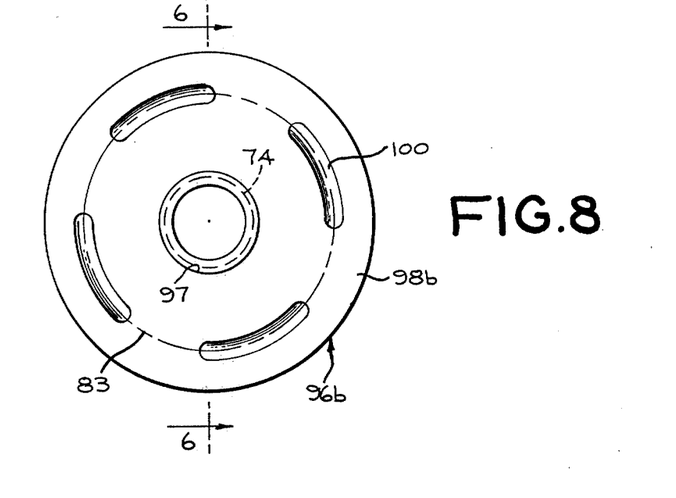
FIGS. 8-9 show elevation views of both broad faces of a rotatable plate used in association with the valve housing of FIGS. 4-6.

The valves 52a and 52b are similar in construction such that only the structure of the valve 52b need be explained. The valve 52b is slippably mounted on the shaft 64b adjacent one end of the rotatable housing 60 so that the cylindrically shaped valve housing 70b remains non-rotatable on the shaft 64b at all times. A cylindrical core 72 is bored through the housing 70b into which is disposed a bushing 74. The shaft 64b rotates within the bushing 74, the latter defining a pair of circular channels or grooves 76a, 76b spaced from one another along the longitudinal dimension of the bushing 74 and extending around the periphery thereof.

Figure 5:
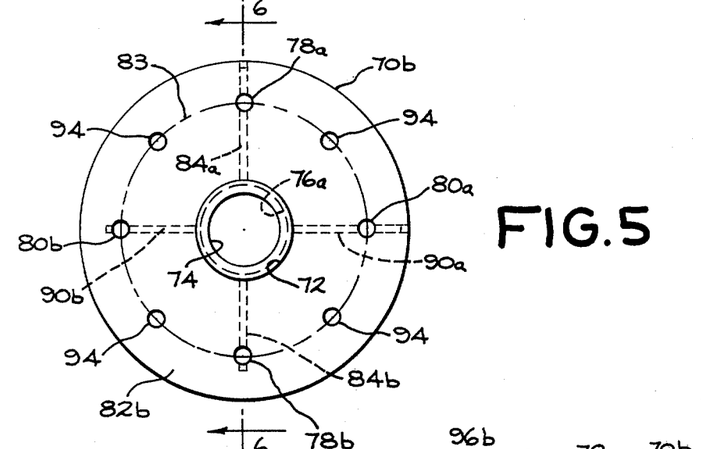
FIG. 5 shows an elevation view of a flat end portion of a valve housing employed in the device of FIG. 4.

The valve housing 70b defines two fluid inlet chambers 78a, 78b and two fluid outlet chambers 80a, 80b. These four chambers each open onto a flat surface 82b on one end of the housing 70b and are disposed in a circle 83 around the axis of the central core 72. The openings of the inlet chambers 78a, 78b are opposite one another across and on the circle 83 while the openings of the chambers 80a, 80b are opposite one another across and on the circle 83 on a line perpendicular to a line through the inlet chambers 78a, 78b.

The inlet chambers 78a, 78b are joined together to pass fluid therebetween by means of holes 84a, 84b drilled through the housing 70b and the central core 72. With the bushing 72 in position in the central core 72, a fluid entering the inlet chamber 78a, passes into the hole 84a, then around the groove 76b, then into the hole 84b and finally enters the inlet chamber 78b. Thus, since both inlet chambers 78a, 78b are interconnected through the holes 84a, 84b and the groove 76b, only one air inlet line need be provided to one of the inlet chambers 78a or 78b, in order to introduce inlet air into both from an external fluid source. In FIG. 4 such a single air inlet line for each valve 52a, 52b may be assumed to be the lines 88a, 88b, respectively.

Similarly, the outlet chambers 80a, 80b are interconnected by means of holes 90a, 90b drilled through the housing 70b to intersect with the groove 76a on the bushing 74. Thus, only one air outlet line 92a, and 92b need be provided for each of the valves 52a and 52b, respectively, to discharge air from each. The air lines 88a-b, and 92a-b extend through the ends of the container 63 and stabilize the valve housings 70a-b on their respective shafts 64a-b so as to restrain the housings 70a-b from rotating.

Also disposed on the circle 83 of the housing 70b are four fluid storage chambers 94, each of which opens onto the flat surface 82b approximately equidistant around the circle 83 between a different pair of te inlet and outlet chambers 78a,b, and 80a, b. The device 50 also includes a pair of rotatable plates 96a,b having flat surfaces 98a,b, respectively. Which abutt the flat ends 82a,b of the valve housing 70a,b, respectively. The plate 96b (FIG. 8), similar to the plate 96a, has a central core 97 bored therethrough to allow the plate 96b to be slippably mounted on the bushing 74. Referring to the plate 96b, (FIG. 8 particularly), there will be seen a series of elongated arc shaped recesses or slots 100 disposed on the circle 83, the circle 83 being imaginary and having a defined radius the same on the face 98b as on the face 82b. The length of the arc formed by the slots 100 is at least sufficient to alternately interconnect one of the inlet chambers 78a or b to one of the neighboring storage chambers 94, and thereafter, interconnect the same one of the storage chambers 94 to one of the outlet chambers 80a or b during successive portions of each complete rotation of the plate 96b. However, the slots 100 must not be so long that they will interconnect an inlet, storage, and outlet chamber together at the same time during any portion of the rotation of the plate 96b. Accordingly, the faster the plate 96b rotates, the more fluid that will be transferred by the slots 100 from the inlet chambers 78a, b to the outlet chambers 80a, b during a given time period, up to the point of saturation of the valve 52b wherein virtually all of the fluid being delivered to the inlet chambers is being transferred to the outlet chambers. As a result, the average pressure of the fluid in the outlet line 92b will be proportational to the speed of rotation of the plate 96b, again, up to the point of valve saturation beyond which its operation becomes non-linear.

Figure 9:
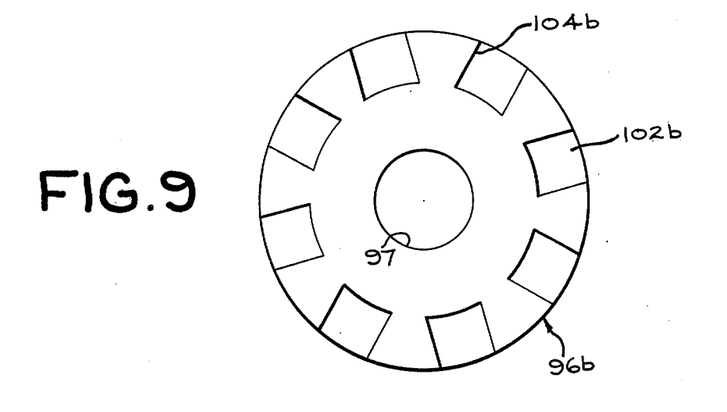

The plate 96b is caused to rotate against the valve face 82b by the ratchet arm 66b when the shaft 64a rotates in the counterclockwise direction (as viewed looking into the end of valve 52a of FIG. 4) at a greater speed than the clockwise rotation of the shaft 64b. Under these conditions, the follower gear shaft 62b will rotate so as to force the free end of the arm 66b against the plate 96b where it will engage one of a series of raised ribs 104b radially disposed about the face 102b. Thereafter, as the follower gear shaft 62b continues to rotate in the same direction, the arm 66b will slip upon the shaft 62b since its free end is restrained from further rotation by the face 102b. This slippable feature of the arm 66b will be explained later herein. Accordingly, the arm 66b will produce counterclockwise rotation of the plate 96b in unison with the counterclockwise rotation of the housing 60 to produce a fluid output signal on the line 92b.

Now assume that the shaft 64a continues to rotate in the counterclockwise direction but at a slower speed than the clockwise rotation of the shaft 64b. Now the housing 60 will rotate in a clockwise direction at a speed equal to the speed difference of the shafts 64a, b. The shaft 62b will continue to force the free end of the arm 66b against the face 102b but, in this case, the free end of the arm 66b will simply bounce or skip across the ribs 104b as the housing 60 rotates, without engaging ribs 104b thereof. Accordingly, under these circumstances, the plate 96b will not rotate and there will be no fluid output signal generated on the output line 92b. However, at the same time, the opposite arm 66a, being forced by the shaft 62a against the plate 96a, will engage ribs 104a to produce rotation of the plate 96a clockwise in unison with the rotation of the housing 60. Consequently, the valve 52a will now operate to produce an output signal on the line 92a indicative of the fact that the counterclockwise rotating shaft 64a is rotating at a slower speed than the clockwise rotating shaft 64b and further indicative of the speed difference.

Now, suppose that the shaft 64a is being driven to rotate in a clockwise direction while the shaft 64b is rotated counterclockwise (the reverse of the previously discussed condition). The follower gear shafts 62a, b will likewise rotate in directions reversed from the previous situation, such that the arms 66a, b will flip over against the plates 96b, a, respectively, opposite their positions as shown in FIG. 4. If, under these conditions, the clockwise rotating shaft 64a turns at a faster rate than the counterclockwise rotating shaft 64b, the housing 60 will also rotate clockwise such that the arm 66a will engage ribs 104b and operate the valve 52b while the valve 52a remains inactive. Conversely, should the shaft 64a turn at a slower rate than the shaft 64b, but in the same direction, the housing 60 will rotate counterclockwise such that the arm 66b will rotate the plate 96a to operate the valve 52a while the arm 66a will skip across the ribs 104b and the valve 52b will remain inactive.

Figure 10:
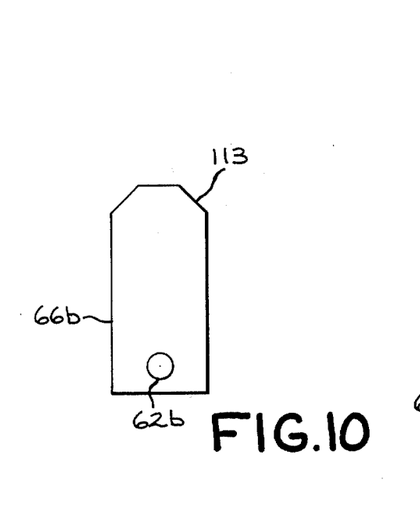
FIGS. 10-11 show full front and a side cross-section elevation view, respectively, of a ratchet arm assembly used in the device of FIG. 4.
Figure 11:
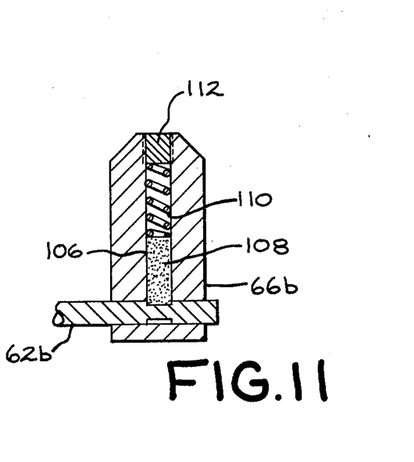

Referring specifically to FIGS. 10 and 11, the means by which the ratchet arm 66b is caused to skip upon the shaft 62b when its free end is forced against the plate 96a orb is shown. A hollow shaft 106 is formed through the free end of the arm 66b along the length thereof until it intersects with the shaft 62b. A friction material 108 such as plastic of any suitable and well known type is then disposed in a base portion of the shaft 106 so as to ride against the shaft 62b. Above the friction material 108, a spring 110 is disposed in the shaft 106 and confined therein under a suitable degree of compression by a cap or plug 112. Now, when the free end of the arm 66b is in the space between and off of the plates 96a-b, the friction material 108, compressed against the shaft 62b by the spring 110, causes the arm 66b to rotate in unison with the shaft 62b. However, when the free end of the arm 66b strikes one of the plates 96a or b, further rotation of the arm 66b is thereby restrained while the shaft 62b continues to rotate by overcoming the friction of the material 108 pressing against it. The arm 66a (FIG. 4) is constructed in a similar manner. The top edges 113 of the free end of the arms 66a, b, preferably, are tapered to lie flat against the faces 102a, b when the arms 66a, b are tilted thereagainst. Also, with regard to FIG. 4, a pair of springs 101a, b are disposed about the shafts 64a, b, respectively, and confined in compression between the end walls of the container 63 and the adjacent valve housings 70a, b to maintain the latter in close slidable contact against the plates 96a, b.

Figure 12:
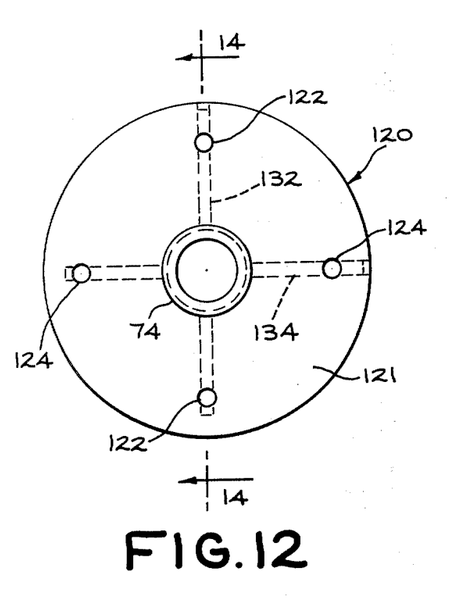
FIG. 12 shows an end elevation view of a valve housing suitable for use in place of the valve housing of FIG. 4, illustrating another preferred embodiment of the rotary valve of my invention.
Figure 13:
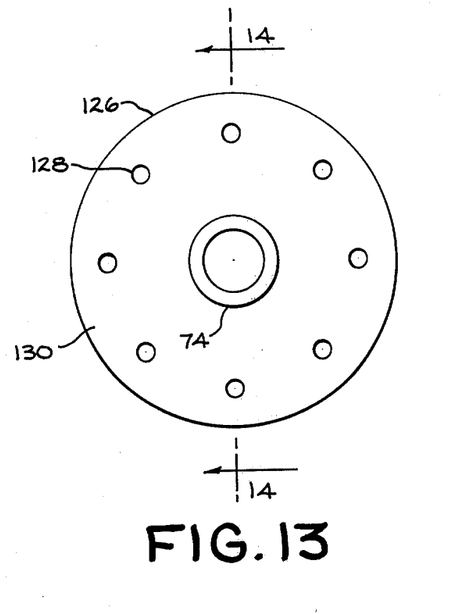
FIG. 13 is an end elevation view showing one broad face of a rotatable plate used in association with the valve housing of FIG. 12.
Figure 14:
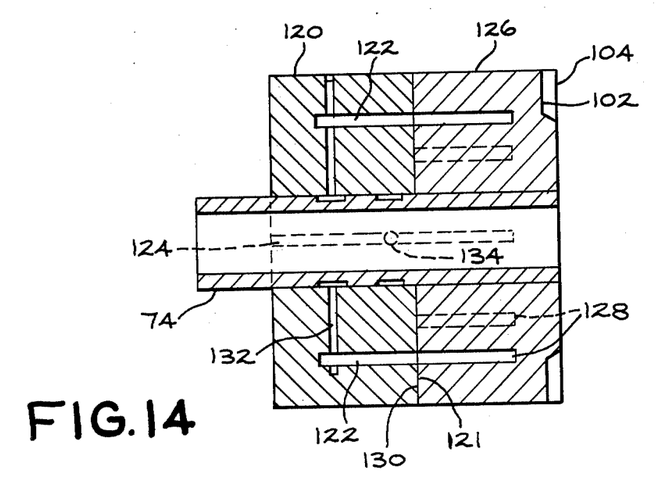
FIG. 14 is a cross-sectional side elevation view of the valve housing of FIG. 12 and the rotatable plate of FIG. 13 as viewed along lines 14—14 of the latter two figures.

Referring now to FIGS. 12-14, another preferred embodiment of my rotary valve, suitable for use in the device 50 of FIG. 4 is shown. In this example, a cylindrically shaped valve housing 120 is provided similar in shape to the housing 70a, b of the previous example. A pair of fluid inlet chambers 122 and a pair of fluid outlet chambers 124 are provided and spaced in a circle around the housing 120, similar to the previous example. Also a disc shaped rotatable plate 126, similar in shape to the plate 96b of the previous example, is provided which contains a series of recesses or slots 128 opening onto a flat face 130 thereof. The inlet and outlet chambers 122, 124 are connected in pairs by shafts 132, 134, respectively, and the housing 120 and plate 126 are mounted on a bushing with shaft connecting grooves thereon similar to the grooves 76a, b on the bushing 74 of the previous example.

In the present example, however, the recesses 128 on the plate 126 transfer fluid introduced into them from the inlet chambers 122, directly to the outlet chambers 124 as the valve housing 120 and plate 126 rotate relative to one another. The recesses 128 of this example thus perform the dual functions of both the slots 100 and the storage chambers 94 of the previous example. Also, the recesses 120 must be adapted so that each one connects first to an inlet chamber 122 and, thereafter, to an outlet chamber 124 during successive intervals of time during each complete rotation of the plate 126 so as to transfer fluid therebetween without simultaneously interconnecting a pair of the chambers 122 and 124 together at any time. It will be apparent to those skilled in the art that the valves illustrated herein need only contain one inlet, storage and outlet chamber, although a series of each may be employed as a matter of choice. Also, the valves 52a, b and the valve of the present example can be operated by rotating the housings 70a, b and 120 while their respective plates 96a, b and 126 remain immobile. Similarly, the valves of these examples may be operated by adapting both the valve housings and plates associated therewith to rotate relative to one another.

Figure 15:
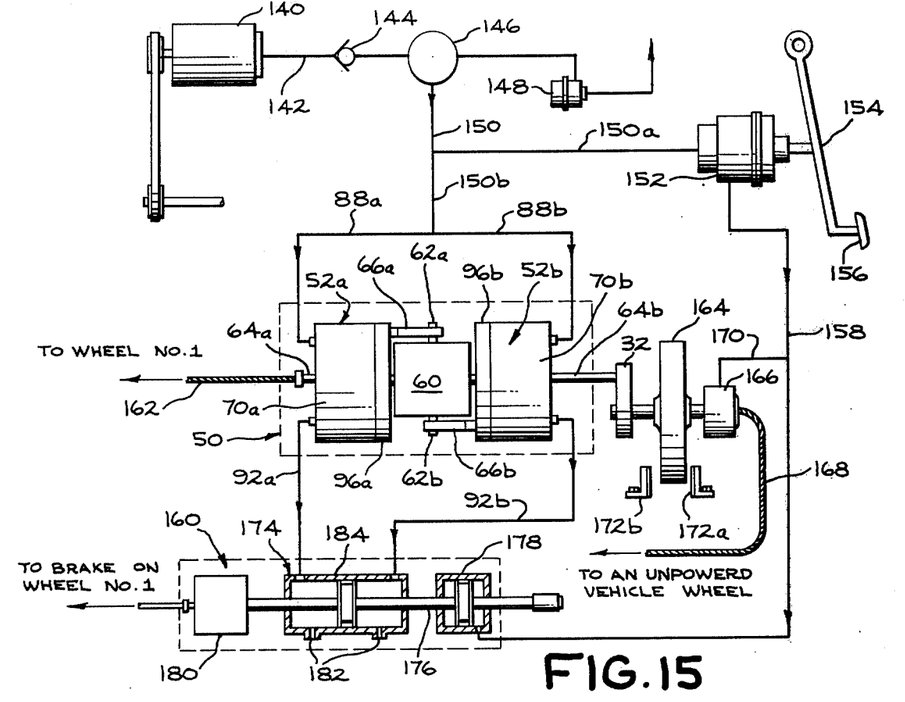
FIG. 15 shows, schematically, a circuit diagram for a fluid operated system for automatically controlling vehicle wheel brakes to minimize skid and spin conditions employing the device of FIG. 4 therein, thus illustrating another preferred embodiment of my invention.

Referring now to FIGS. 4 and 15, a novel application for the monitoring device of my invention consisting of an improved system for automatically controlling vehicle wheel brakes to minimize their tendency to skid and spin is shown. Specifically, a conventional belt driven automobile compressor 140 provides high pressure air through an air line 142 and a one-way check valve 144 to a high pressure air storage reservoir 146. The reservoir 146 acts as a fluid source to drive the control system and should preferrably be connected to a high pressure air relief valve 148 to maintain the air pressure in the system within the safe design limits of its various components. Air is delivered from the reservoir 146 through a line 150 and a branch line 150a to a suitable brake pressure control valve 152 which is, in turn, responsively connected to a lever 154 of a vehicle brake pedal 156. The valve 152 generates high pressure air in a line 158 when the pedal 156 is depressed, the air pressure therein being proportional to foot pressure on the pedal 156. One such suitable valve for this purpose is disclosed in my previously filed U.S. Pat. application Ser. No. 640,865, filed Dec. 15, 1975 as previously referred to herein.

The line 158 is operatively connected to the four automobile brake cyclinder assemblies each of which assemblies, in turn, operate a brake mechanism on a different one of the vehicle wheels. Since all such assemblies may be similar in construction, only the assembly 160 which controls the brake mechanism of the wheel 1 of the vehicle is shown.

The reservoir 146 also supplies air through the line 150 and a branch line 150b to both of the inlet lines 88a and 88b of the device 50 (illustrated in detail in FIG. 4). The shaft 64a is rotatably driven by a flexible cable 162 which is, in turn, responsively connected to the vehicle wheel 1. The shaft 64b is connected through the gear train 32 to a flywheel 164 which serves as an inertial vehicle speed reference. A more detailed description of such inertial references is disclosed in my previously filed U.S. Patent application, Ser. No. 640,865, previously referred to herein. Another flywheel assembly suitable for use as an inertial vehicle speed reference in this example is disclosed in U.S. Pat. No. 3,649,083 issued to Otto Depenheuer on Mar. 14, 1972 and entitled "Antiskid Device."

The flywheel 164 is rotatably driven through a clutch 166 by a flexable cable 168 which is, in turn, responsively connected to an unpowered wheel of the vehicle. The clutch 166 is connected through an air line 170 to the line 158 and valve 152 and operates to decouple the flywheel 164 from the cable 168 so as to rotate inertially when the pedal 156 is manually depressed and the valve 152 is operated. The flywheel 164 may be adapted to slide in the forward direction of the vehicle, as the vehicle decelerates during brake operation, to frictionally engage the surface of a brake pad assembly 172a. Under such circumstances, the flywheel 164 will engage the pad 172a with a force proportional to vehicle deceleration during brake operation, such that it will slow down at a rate substantially proportional to vehicle deceleration. Accordingly, the flywheel 164 can readily be adapted to maintain a speed substantially equal or proportional to vehicle speed at all times, whether the vehicle is accelerating, decelerating or moving at constant speed.

The outlet lines 92a and 92b of the device 50 are connected to opposite sides of a double action cylinder 174 to supply a wheel skid or wheel spin correcting signal, respectively, to the assembly 160. The assembly 160 is composed of three units operated together by a common shaft 176. A first cylinder 178 is the manual air brake operating unit to which brake pressure is manually applied through the line 158. The second unit is the cylinder 174 which is responsively connected to the device 50 to provide wheel skid or spin control as previously explained. The third unit is a hydraulic brake master cylinder 180 which responds to the action of the cylinders 174 and 178 to operate the brake mechanism of the wheel 1. The cylinder 174 is provided with a pair of small air vent ports 182 located on either side of a cylinder disc 184 to discharge air built up therein following its operation.

In typical operation, suppose the brake pedal 156 is depressed to apply brakes to the vehicle wheels, including the wheel 1. The clutch 166 will operate to disconnect the flywheel 164 from its driving source so as to rotate inertially. Translational inertia of the flywheel causes the flywheel to slide forward against the brake pad 172a to decelerate at the same rate as the vehicle decelerates. Assuming no skid condition, the wheel 1 will slow at the rate as the vehicle, whereby the shafts 64a and 64b will maintain the same speeds of rotation during the brake operation. Under these non-skid conditions, the valves 52a and 52b will remain inoperative and there will be no skid or spin correcting signals generated in the lines 92a and 92b. Accordingly, the cylinder 174 will not be operative and the rate of vehicle deceleration will be controlled entirely manually by the operation of the pedal 156 and the cylinder 178.

However, suppose a skid condition occurs on the wheel 1 during braking such that it either locks or rotates at a speed less than that of the flywheel 164. The housing 60 will then rotate at a speed proportional to the difference in wheel and vehicle speed to operate the valve 52a. In turn, a skid correcting signal will be generated in the line 92a to force the disc 184 in a direction opposite to the force being applied by the operator on the valve 178. The signal thus generated will be proportional to the wheel and vehicle speed difference or, in other words, proportional to the amount of skid. The operation of the valve 174 to correct the skid will continue until the signal on the line 92a ceases which will only occur when the shafts 64a and 64b are return to the same speeds once again. Air pressure then remaining in the system bleeds off through the air vent ports 182.

Now, suppose the wheel 1 to which the device 50 is connected is a power driven vehicle wheel and suppose the operator applies power to the vehicle to the point where the wheel 1 begins to slip or spin on the roadway. Under these conditions, the wheel 1 will rotate faster than the flywheel 164 (which remember, is connected to an unpowered wheel) such that the housing 60 will rotate in a direction opposite to the anti-skid case, to operate the anti-spin valve 52b. An anti-spin error correcting signal will thus be generated in the line 92b to force the cylinder 174 to apply the brakes to wheel 1 to eliminate the slippage thereof during the period that the operator is applying the vehicle accelerator.

Note that by using the device 50, my system will also operate to control skidding and spinning of the vehicle wheels when the automobile is operated in reverse as well as when operated in the forward direction. In this case, the ratchet arms 66a and 66b will flip from the positions shown in FIG. 15 to control operation of the opposite plates 96b and 96a respectively, such that an anti-skid signal will still be generated on the line 92a when the wheel 1 skids and such that an anti-spin signal will still be generated on line 92b when the wheel 1 slips or spins. Note that when the vehicle travels in the reverse direction, a second brake pad 172b located on the opposite side of the flywheel 164 from the pad 172a controls flywheel deceleration. Nevertheless, the operating principle of the flywheel 164 is the same in the reverse direction of travel as in the forward direction.

Thus my improved control system of the present example provides maximum flexibility for controlling both wheel skid and spin conditions, whether the vehicle is moving in a forward or a reverse direction. Moreover, because of the features inherent in the differential gear assembly of the device 50, the system of my invention does not make a continual demand on the vehicle air compressor 140 or the reservoir 146. Air is only used by the system when a vehicle skid or spin condition occurs and not otherwise. Accordingly, the compressor 140 and reservoir 146 can be readily shared between my system and other compressor operated systems in the vehicle such as an air pollution control system, for example. Another important feature of this system is that, should the control system become inoperative because of a rupture of the line 150b, or because of a break in the cables 162 or 168, for example, the vehicle brakes can still be operated manually in the same manner and to the same extent as they would operate if my system were not installed in the vehicle. It should be noted that a different monitoring device, similar to the device 50, must be employed between the flywheel 164 and each of the remaining wheels and corresponding brake cylinders in order to provide the same skid and spin control protection to them as is provided to the wheel 1 of the present example.

Figure 16:
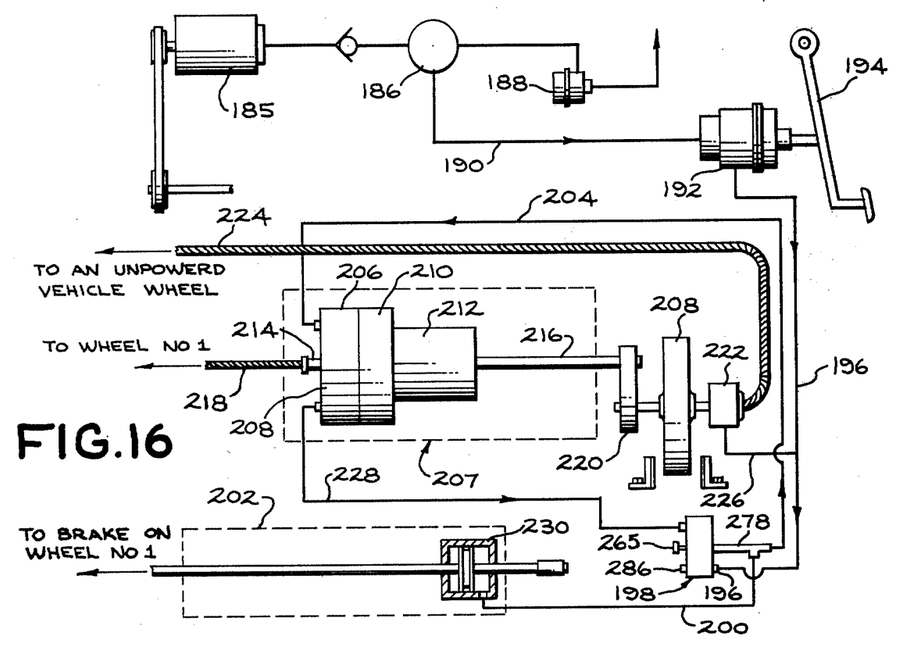
FIG. 16 shows, schematically, a circuit diagram for a simplified fluid operated system for automatically controlling vehicle wheel brakes to minimize a skid condition, thus illustrating yet another preferred embodiment of my invention.
Figure 17:
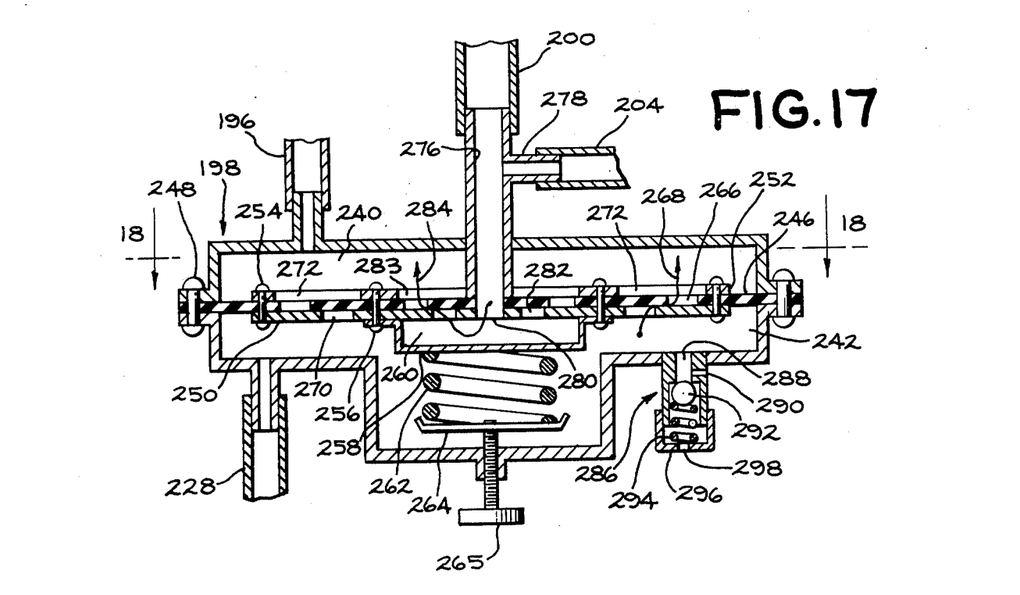
FIG. 17 shows a cross-sectional view of the structure of the modulating valve of system of FIG. 16.

Referring now to FIGS. 16 and 17, there is shown, in another preferred embodiment of my invention, a simplified system for controlling only the tendency of a vehicle wheel to skid. A compressor 184 supplies high pressure air to an air storage reservoir 186 connected to a pressure relief valve 188. Air to drive the system is conveyed by a line 190 to a brake pressure control valve 192 responsively connected to a vehicle brake pedal assembly 194. Upon operation of the assembly 194 and valve 192, a brake pressure signal is introduced in to a line 196 to operate a modulating air valve 198. While the structure of the valve 198 will be explained in detail later herein, it suffices now to say that this valve operates to control the pressure in the line 196 passing therethrough into an air line 200 to operate a brake control cylinder assembly 202 which, in turn, controls the brake mechanism on one of the vehicle wheels.

The valve 198 also supplies output air through a line 204 to the inlet chamber of the valve 206 similar in structure to the valve 52a or 52b of the previous example operates as part of the device 207 for monitoring a difference in the speeds of a vehicle wheel and a vehicle speed flywheel reference 208. The valve 206 includes a stationary housing 208 and a rotatable plate 210. A differential gear assembly, similar to those previously illustrated, is housed within a rotatable housing 212. In this example, however, the plate 210, having a slot arrangement similar to the plates of the previous example, is either fixedly attached to one end of the housing 212 or integrally formed on the end thereof, such that the plate 210 will rotate in unison with the housing 212 at all times. Accordingly, the monitoring device 207 need not include ratchet arms for controlling the plate 210, and the plate 210 does not require a ribbed face as was used in the device 50 and plates 96a and 96b of the previous example.

The driven gears of the differential gear assembly in the housing 212 are connected by shafts 214 and 216 to a flexible drive cable 218 and a gear train 220, respectively. In turn, the cable 218 is responsively connected to a vehicle wheel to which a brake mechanism is applicable and the gear train 220 is responsively connected to the vehicle speed reference flywheel 208. The flywheel 208 is driven through an air operated clutch 222 by a flexible cable 224 which is, in turn, operated by an unpowered vehicle wheel. An air line 226 is connected to the line 196 and adapted to activate the clutch 222 to decouple the flywheel 208 from the drive cable 224 when the brake assembly 194 and valve 192 are manually operated.

An air line 228 is connected between an outlet chamber of the valve 206 and a return port of the valve 198. Now when a wheel skid condition occurs during manual operation of the brake assembly 194, the housing 212 and plate 210 rotate together at a speed equal to the difference in the speeds of the shafts 214 and 216 to generate an anti-skid signal in the line 228. This signal is introduced back to the valve 198 to cause, first, closure of the connection between the lines 196 and 200 and thereafter to reduce the output air pressure in the line 200 controlling wheel brake application of the assembly 202. A principle feature of the system of this example, is that the valve 192 may be easily installed to control pressure to a conventional single action cylinder 230 of the type often found on truck trailers which use air brakes. Thus, no special brake control cylinder assembly is required in order to adapt these trailers to my system. Consequently, the system of the present example can be installed in many present day truck trailers with no modification of their brake system required.

Figure 18:
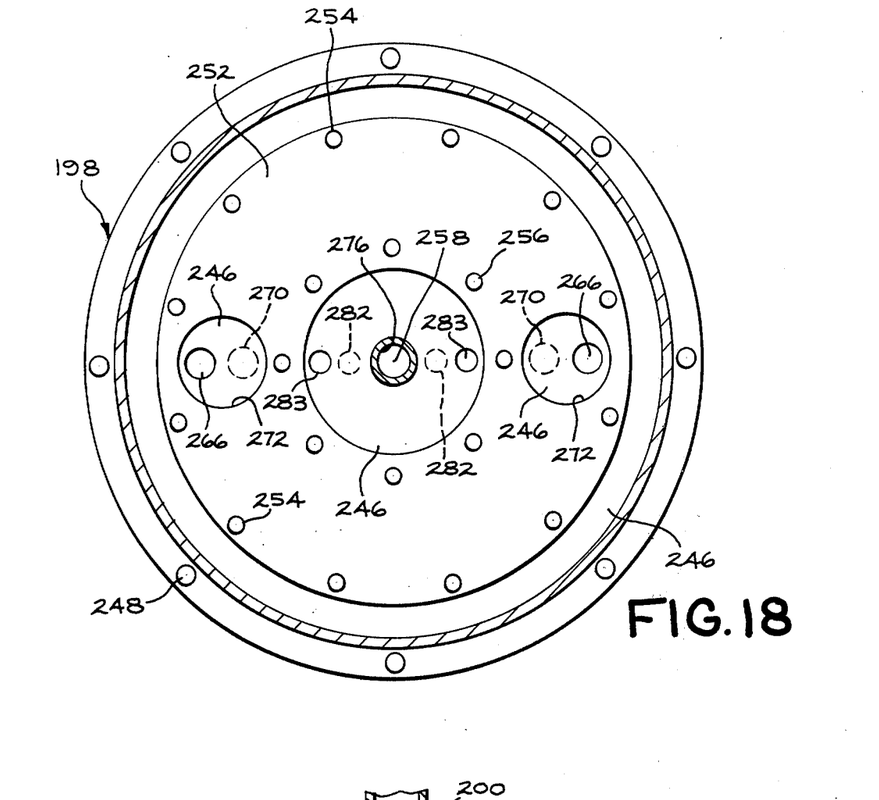
FIG. 18 shows a cross-sectional view of the modulating valve of FIGS. 16 and 17 as viewed along lines 18—18 of FIG. 17.

Referring now specifically to FIGS. 17–18, one preferred embodiment of the modulating valve 198 of the system of FIG. 16 is shown including an air inlet chamber 240 and an air outlet chamber 242 separated by a diaphragm assembly 244. The assembly 244 contains a flexible member 246, such as rubber or the like, which forms a displacable partition between the chambers 240 and 242 and is fastened around the valve housing by suitable fasteners 248. The member 246 is sandwiched between a rigid member 250 on the side facing the outlet chamber 242 and a rigid member 252 on the side facing the inlet chamber 240. The sandwiched members are fastened together by suitable fasteners as at 254 and 256.

Also fastened to the assembly 244 by the fasteners 256 in an enclosed hollow dome shaped housing 258 having an enclosed air chamber 260 therein. A spring 262 is confined in compression between the dome shaped housing 258 and a plate 264. An adjustable screw 265 is provided to adjust the position of the plate 264 in the chamber 242 to obtain the desired biasing force in the spring 262. The flexible member 246 contains holes 266 therethrough which allow high pressure air in the chamber 242 to escape into the chamber 240 under certain circumstances along the route of an arrow designated 268. Specifically, high pressure air from the chamber 242 enters a pair of holes 270 in the rigid member 250 and forces the flexible material of the member 246 around the holes 266 to deflect away from the rigid member 250 toward the chamber 240. The flexible material of the member 246 around the holes 266 is free to give way into a larger void area forming holes 272 through the rigid member 252. Note, however, that because of the offset disposition of the holes 270 in the rigid member 250, relative to the positions of the holes 266 in the flexible member 246, the latter can not deflect toward the chamber 242 to allow air to pass from the chamber 240 into the chamber 242.

A hollow shaft 276 projects across the chamber 240 between a connector 278 and a central portion of the flexible member 246. The spring 262 biases the assembly 244 flat against the open end of the shaft 276 under normal conditions such that the shaft 276 communicates through a hole 280 through the assembly 244 and with the enclosed chamber 260 within the dome housing 258. High pressure air in the chamber 260 can escape through holes 282 in the rigid member 250 to deflect the flexible material of the member 246 toward the chamber 240 to permit air to vent to the latter through holes 283 along the route of the arrow 284. However, due to the offset nature of the holes 282 of the rigid member 250 relative to the holes 283 of the flexible member 246, air cannot transfer from the chamber 240 into the chamber 260 along a route reversed from the direction of the arrow 284.

To complete the construction of the valve of the present example, a high pressure blow-off valve 286 allows for venting of the chamber 242 external to the valve 198. The valve 286 contains an air shaft 288 which communicates with a small air bleed port 290 to permit relatively slow venting of the chamber 242 to external atmosphere. Beyond the bleed port 290, the diameter of the shaft 288 enlarges and contains a ball 292 biased to maintain the end of the small diameter portion of the shaft 288 sealed by means of a spring 294 confined under compression between the ball 292 and an adjustable threaded cap 296. The cap 296 contains a vent port 298 therethrough to allow for high pressure venting of the chamber 242 when the pressure therein is high enough to force the ball 292 to further compress the spring 294 and allow the shaft 288 to communicate with the port 298. High pressure venting will occur in this manner only when the pressure in the chamber 242 reaches a level that will allow the ball 292 to compress the spring 294 under circumstances where the small vent port 290 can not vent the chamber 242 rapidly enough.

In typical operation, the modulating valve 198 of FIGS. 17–18 function in the system of FIG. 16 as follows. First, assume the brakes of the vehicle are manually applied at the pedal 194 such that the vehicle begins to decelerate normally wherein no skid condition occurs. The brake pressure control valve 192 operates to supply high pressure to the inlet chamber 240 through the line 196. Since there is no skid condition occurring during the braking operation in this case, the sensing valve 206 is inoperative and there is no high pressure air being supplied to the chamber 242 through the return line 228. Therefore, assume for the moment, that the air pressure in the chamber 240 is sufficiently greater than in the chamber 242 to overcome the bias of the spring 262 and force the diaphragm assembly 244 away from the end of the shaft 276. Accordingly, air introduced into the chamber 240 from the line 196 will flow into the shaft 276 and into the brake line 200 to operate the assembly 202 to apply wheel brakes. At the same time high pressure air to operate the valve 206 will flow into the line 204.

Now suppose a skid correcting signal is generated in the return line 228 where it is introduced into the chamber 242. Accordingly, the force of the high pressure air in the chamber 242 adds to the force of the spring 262 to force the diaphragm assembly 246 to close against the end of the shaft 276 to cut-off the flow of high pressure air from the brake line 196, through the chamber 240 into the shaft 276 and line 200. The high pressure air now trapped in the line 200 leading to the brake cylinder 230 continues to bleed through the line 204 and to the valve 206 to chamber 242 where it is vented to atmosphere through shaft 288 to release the brake pressure on the cylinder 230 until the skid stops. After the skid is corrected air flow through the return line 228 ceases. When the brake assembly 194 is released, residual high pressure in the chamber 242 flows through the assembly 244 via the route of the arrow 268 thence into the chamber 240 where it bleeds back through the line 196 and out the valve 152. At the same time, residual high pressure air trapped in the line 200 and chamber 260 bleeds into the chamber 240 along the route of the arrow 284. The brake assembly 194 can thus be reapplied very quickly after a skid and skid correction occurs.

The high pressure bleed valve 286 has the bias of the spring 294 adjusted by the threaded cap 296 such that the ball 292 will compress the spring 294 when the pressure in the chamber 242 reaches a level higher than the pressure level therein necessary to close the assembly 244 against the end of the shaft 276. Thus, during a panic stop wherein the brake assembly 194 is heavily applied to cause a skid and wherein the air being bled from line 200 so that line 228 is at a high level, the pressure in the chamber 242 is reduced rapidly, but never below an amount sufficient to keep the assembly 244 closed against the shaft 276. This insures that the brake cylinder 230 can be partially released to stop the skid.

Although the subject invention has been described with respect to specific details of certain preferred embodiments thereof, it is not intended that such details limit the scope of my invention except insofar as is set forth in the following claims.

I claim:

1. A fluid operated modulating valve comprising
   a housing,
   a diaphragm assembly disposed in said housing to form a partition therein defining a first and second fluid chamber on opposite sides of said partition, said diaphragm assembly comprising
   a flexible diaphragm member, and
   first and second rigid members disposed on opposite sides of said flexible member facing said first and second chambers, respectively, said members being rigidly interconnected,
   means for introducing a fluid, under pressure, into said first chamber, and
   means for venting a fluid from said first chamber through all of said members into said second chamber when the pressure in said first chamber is greater than the pressure in said second chamber, and for maintaining fluid tight separation between said chambers when the pressure in said first chamber is less than the pressure in said second chamber.

2. The modulating valve of claim 1 wherein said venting and maintaining means comprises
   a hole defining portion of said first rigid member forming a first fluid access opening through said first rigid member,
   a hole defining portion of said flexible member forming a second fluid access opening through said flexible member, said first and second openings being offset and spaced from one another, and
   a hole defining portion of said second rigid member forming a third fluid access opening relatively larger in area than said second opening and in registry therewith, whereby a rim defining portion of said second opening will deflect into said third opening to provide communication between said first, second and third openings when the pressure of a fluid in said first chamber is greater than the pressure of a fluid in said second chamber.

3. The modulating valve of claim 1 further comprising
   a fluid port projecting through said housing and into said second chamber toward said diaphragm assembly, said rigid members and said flexible member having holes therethrough in registry with one another and with said fluid port for permitting a fluid to flow through said port and housing from an external source into said first chamber,
   means for biasing said diaphragm away from said first chamber and toward said second chamber tending to maintain said port in communication with said first chamber and in fluid tight isolation from said second chamber, said diaphragm assembly being movable away from said second chamber toward said first chamber when the pressure of a fluid in said second chamber exceeds the pressure of a fluid in said first chamber by an amount of sufficient to overcome said biasing means, whereby said second chamber communicates with said port to vent a fluid in said second chamber through said port and housing to an external location.

4. The modulating valve of claim 3 further comprising means for adjusting the level of bias of said biasing means.

* * * * *